United States Patent [19]

Aréne et al.

[11] Patent Number: 4,756,879
[45] Date of Patent: Jul. 12, 1988

[54] CORE COVER PLUG OF A LIQUID METAL-COOLED NUCLEAR REACTOR

[75] Inventors: Gilbert Aréne, Pertuis; Philippe Verriere, Manosque; Luigi Pierazzi, Aix en Provence; Charley Renaux, Jouques, all of France

[73] Assignee: Commissariat a l'Energie Atomique, Paris, France

[21] Appl. No.: 613,882

[22] Filed: May 24, 1984

[30] Foreign Application Priority Data

May 26, 1983 [FR] France ................................ 83 08734

[51] Int. Cl.⁴ .............................................. G21C 13/06
[52] U.S. Cl. .................................... 376/460; 376/206; 376/253
[58] Field of Search ............... 376/404, 460, 205, 206, 376/290, 253

[56] References Cited

U.S. PATENT DOCUMENTS 4,639,350  1/1987  Malaval ................................ 376/290

FOREIGN PATENT DOCUMENTS 2289031  5/1976  France .
2283504  10/1978  France .
2031642  4/1980  United Kingdom .

OTHER PUBLICATIONS

Patents Abstracts of Japan, vol. 3, No. 69, 14 Juin 1979, p. 95M62, & JP-A-57-45476 (Tokyo Shibaura Denki K.K.), 04-10-1979.
Patents Abstracts of Japan, vol. 3, No. 97-(M-69), 17 Aout 1979, p. 44M69 & JP-A-54-71293 (Tokyo Shibaura Denki K.K.), 06-07-1979.
Patents Abstracts of Japan, vol. 3, No. 93(M-68), 8 Aout 1979, p. 139M68, & JP-A-54-69694 (Tokyo Shibaura Denki K.K.), 06-04-1979.
Patents Abstract of Japan, vol. 3, No. 154, 18 Decembre 1979, p. 34M85, & JP-A-54-130788 (Tokyo Shibaura Denki K.K.), 10-11-1979.
Kernenergie, vol. 17, No. 7, 1974 (Berlin, DE), K. Gorski et al., "Das Kernkraftwerk Bruno Leuschner Greifswald", pp. 200–222.

Primary Examiner—John F. Terapane
Assistant Examiner—John S. Maples
Attorney, Agent, or Firm—Pearne, Gordon, McCoy & Granger

[57] ABSTRACT

Core cover plug for a liquid metal-cooled nuclear reactor.

It comprises a structure constituted in part by suspension elements fixed to the lower plate of the small rotary plug, and in part by control rod sleeve elements and a conical deflecting plate positioned directly above the core. The suspension elements, which can either be rod sleeves or rigid tie rods, support the sleeve elements by means of one or more grids constituted by intersecting vertical plates. The deflecting plate, which itself carries a group of sampling tubes, is fixed to certain sleeve elements by a connection permitting radial sliding.

4 Claims, 5 Drawing Sheets

CORE COVER PLUG OF A LIQUID METAL-COOLED NUCLEAR REACTOR

BACKGROUND OF THE INVENTION

The present invention relates to nuclear reactors, particularly liquid metal-cooled fast neutron reactors. In such reactors, the core is mounted within a system of vertically axed vessels ensuring the confinement of the appropriate volume of metal, generally liquid sodium. This volume is surmounted by a neutral gas atmosphere and the system of vessels is closed by a slab, provided with passage orifices permitting access to the core within the vessel. These orifices are closed by rotary plugs. The smallest of the rotary plugs is itself provided with an opening closed by a plug for supporting the means making it possible to inspect and check the reactor core, as well as deflect the hot sodium jet leaving the core. These means and the structure maintaining the same form an assembly called the core cover. The latter is suspended on said plug, inclined in the smallest rotary plug, by a suspension structure and the assembly formed by these three structures, i.e. the plug, the suspension elements and the core cover is called "the core cover plug". The invention more particularly relates to such a core cover plug.

To illustrate the prior art, a description will be given hereinafter with reference to FIG. 1 of a special embodiment of a nuclear reactor core cover plug as described in French Pat. No. 7,429,543 filed on Aug. 29th 1974 by the Commissariat à l'Energie Atomique and published under No. 2,289,031.

In FIG. 1, reference numeral 1 designates a fast neutron nuclear reactor core, which is shown immersed in a liquid metal mass, particularly sodium, which ensures the coring of the reactor. Core 1 is mounted within an inner vessel 2, surrounded by a second, main vessel 3, whose upper part is sealed by a slab 9, which confines the liquid sodium, up to the level indicated at 4, which is surmounted by a covering neutral gas atmosphere 5, generally formed by argon. Vessel 3 is itself surrounded by another vessel, called the safety vessel 6, the system of said vessels with their common vertical axis being arranged within a concrete protection enclosure 7. The latter has a wide opening 8 in its upper part in which is mounted the sealing slab 9. The latter has a central opening 10 for fitting a system with two plugs 11, 12 which, by their mutual rotation, permit access to all points of the core 1. In addition, slab 9 has passages for the fitting of the equipment supported by it, such as pumps and exchangers necessary for the circulation of the sodium. One of each type is diagrammatically shown in FIG. 1, where reference numeral 13 designates a pump and 14 an exchanger. Finally, the core instrumentation is supported by an independent structure, the core cover plug 15, which is itself suspended on the small rotary plug 12.

This core cover plug comprises a head plate 16 level with the small rotary plug 12. This plate supports a cylindrical tube or ferrule 17 which, on its lateral faces, has regularly spaced orifices 18. The ends of intermediate spacers 19, 20 bear on ferrule 17, whose lower part is closed by a thick plate constituting the heat shield 23. Within the ferrule 17 pass vertically the sleeve tubes 26 used for the passage of control rods or instrumentation.

The construction of the hitherto known core cover plugs for liquid metal-cooled reactors suffer from a certain number of disadvantages. In particular, their great rigidity necessary to withstand earthquakes, is obtained by using very thick structures, which gives them a high thermal inertia. This makes it difficult to absorb the very high transient phenomena resulting from variations in the power conditions producing sudden temperature variations in the hot metal leaving the reactor core.

SUMMARY OF THE INVENTION

The present invention specifically relates to a core cover plug for a liquid metal-cooled nuclear reactor, whose design makes it possible to obtain, with thin walls, the rigidity necessary to be able to withstand earthquake shocks. This core cover plug has, as a result of the use of said thin walls, a minimum thermal inertia making it possible to accept transient operating conditions leading to significant variations in the temperature of the liquid metal directly leaving the core.

This core cover plug of a liquid metal-cooled nuclear reactor comprising in per se known manner a system of vessels sealed by a slab provided with two rotary plugs, said core cover plug being suspended on the small rotary plug, is characterized in that it comprises a structure constituted in part by suspension elements fixed to the lower part of the small rotary plug, and in part by control rod sleeve elements, said two assemblies being joined, at least at a horizontal level, by vertical metal plates forming a honeycomb grid, and a conical deflecting metal plate, positioned directly above the core and fixed to certain sleeve elements by a connection permitting radial sliding.

In a first constructional variant of the invention, the suspension elements are control rod sleeves.

In a second variant of the invention, the suspension elements are sections having varied shapes, e.g. having a cross or square cross-section.

According to another important feature of the invention, the deflecting plate of the nuclear reactor core cover plug according to the invention supports a group of sampling tubes making it possible to sample the liquid metal on leaving the core for locating possible sheath fractures and the position of thermocouples, said group of tubes being rigidified by two other truncated cone-shaped plates which also contribute with the actual deflecting plate to the deflection of the hot sodium jet leaving the core.

The nuclear reactor core cover plug according to the invention thus provides a thin walled structure making it possible to withstand high thermal transient conditions and, as a result of its rigidity, to limit the reactions to earthquake shocks.

BRIEF DESCRIPTION OF THE DRAWINGS

The invention is described in greater detail hereinafter relative to the attached drawings, apart from the already described FIG. 1, wherein show:

FIG. 4a the detail of fixing with clearance the deflecting plate to the sleeve elements.

DETAILED DESCRIPTION OF THE EMBODIMENTS

Figure 1:
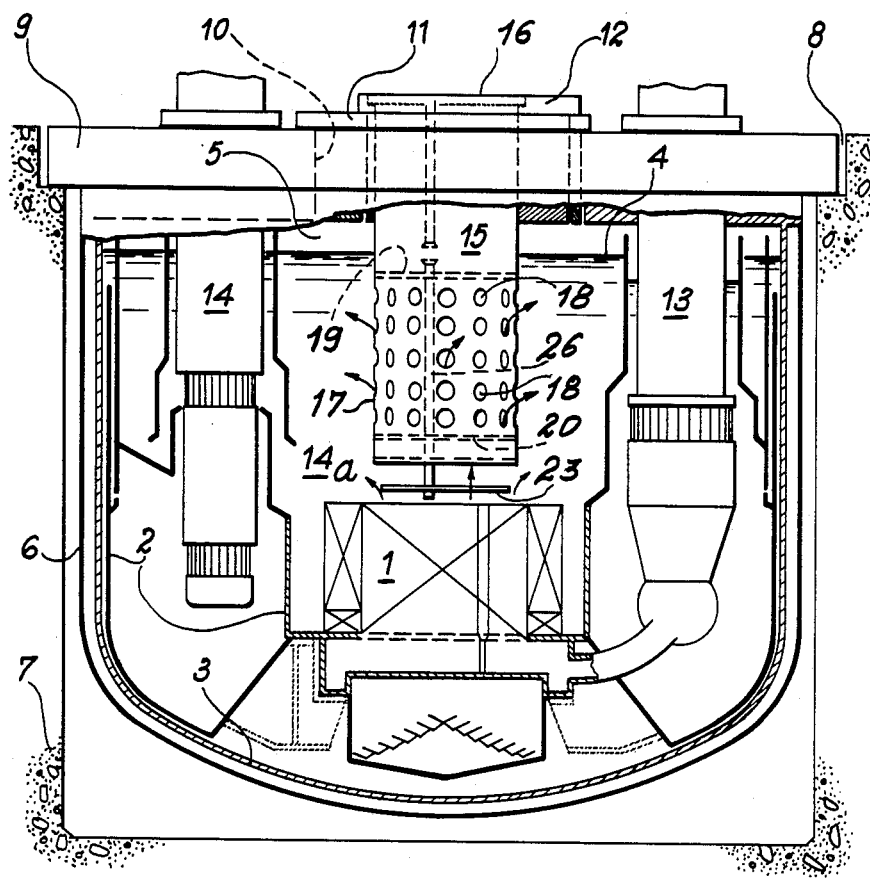
Figure 2:
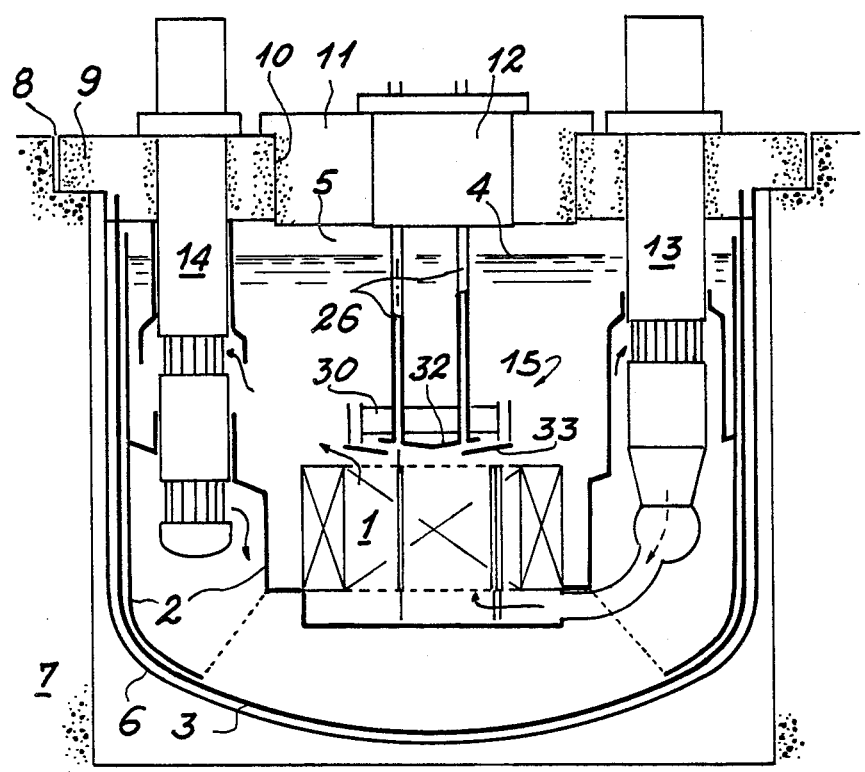
FIG. 2 a cross-sectional view of a sodium-cooled fast neutron nuclear reactor using the core cover plug according to the invention.

FIG. 2, which shows in sectional form a sodium-cooled fast neutron nuclear reactor, uses the same reference numerals for the main elements of FIG. 1 according to the prior art and these will not be described again. According to the invention, this reactor is equipped with a core cover plug 15 essentially comprising, above reactor core 1, a deflecting plate 32 suspended on the lower part of an inner small rotary plug 12, either by means of sleeve tubes 26, which is the case in FIG. 2, or by metal tie bolts with rigid sections as will be described hereinafter. These suspension elements 26 are joined together and to the sleeve elements 28 (FIG. 3) the passage of the control rods, in at least one horizontal plane, by a grid 30 formed from intersecting vertical metal plates 43 (FIG. 3).

Figure 3:
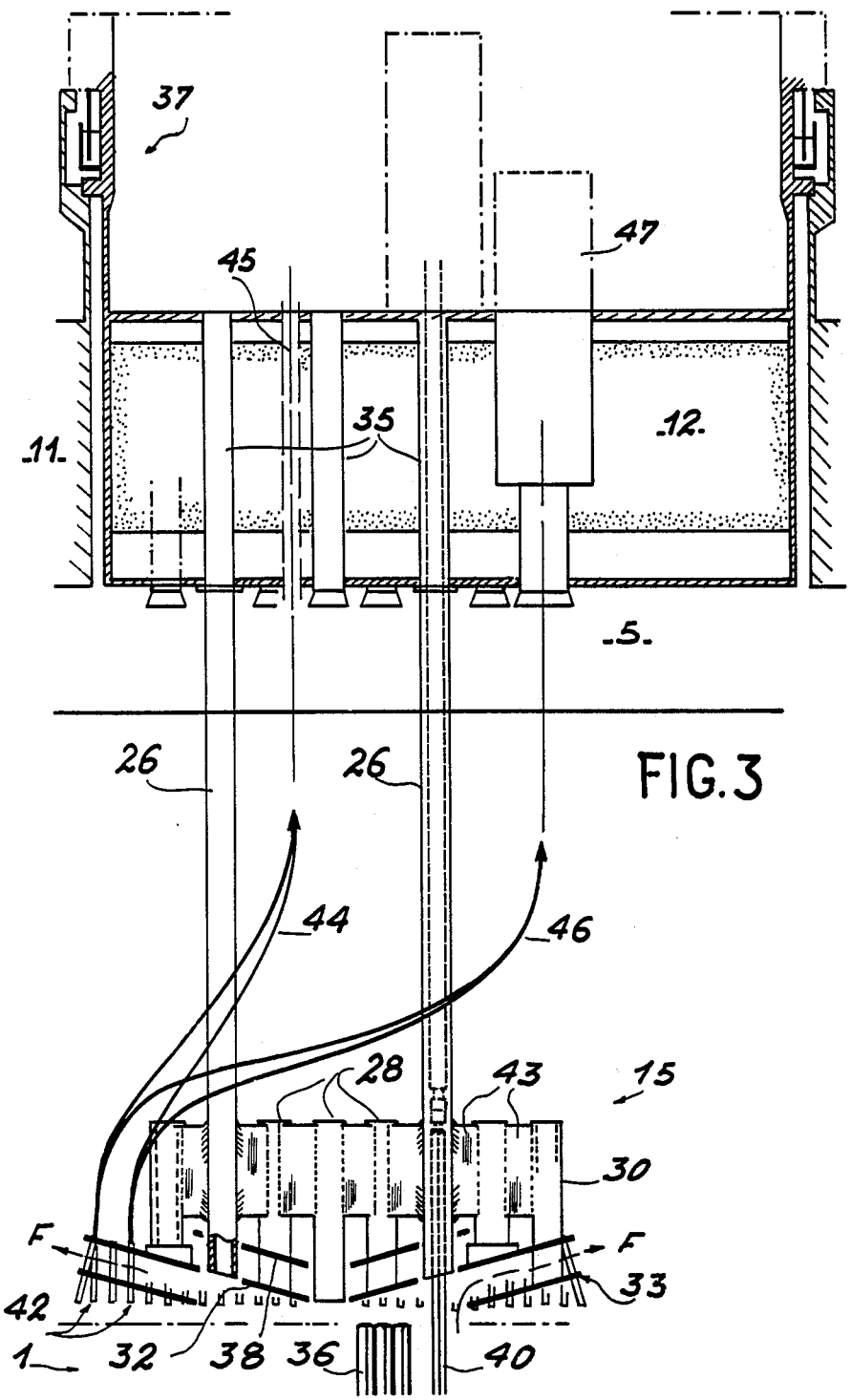
FIG. 3 a section along axis XX of FIG. 5 of the core cover plug assembly according to the invention.

FIG. 3 is a larger scale diagrammatic view of FIG. 2 showing the organization of the core cover plug 15. According to the invention, a certain number of metal sleeves 26 and sleeve elements 28 are linked with the passages 35 of plug 12 and are used for introducing into the core absorbing rods 40, making it possible to regulate the reactor reactivity level.

According to the invention, beneath grid 30 and above reactor core 1, certain sleeve elements 28 support a conical deflecting plate 32 which, as explained hereinbefore, makes it possible to deflect the hot sodium jet leaving the assemblies 36 and as indicated by arrows F. Deflecting plate 32 supports sampling tubes 42 used on the one hand for sampling the liquid metal on leaving the core in order to locate the existence of a possible sheath fracture in one of the assemblies 36, and on the other hand to permit the location of thermocouples which directly measure the temperature of the hot sodium leaving core 1. From each of the sampling tubes 42, the information supplied by the thermocouples is passed by sheaths 44 passing through the rotary plug 12 into pipe 45. The hot sodium samples taken at the outlet of assemblies 36 are passed by metal tubes 46 to the sheath fracture locating equipment 47.

Figure 4:
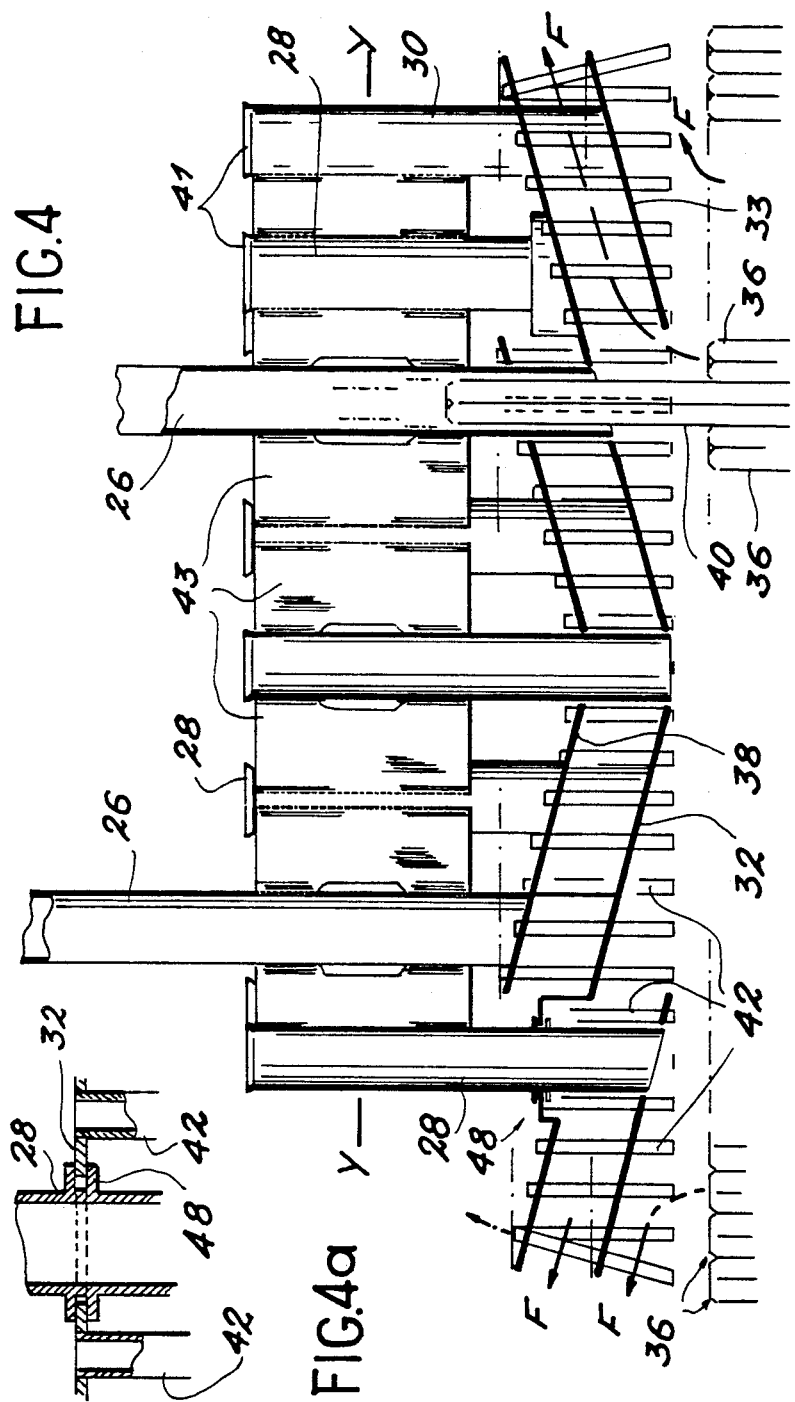
FIG. 4 a sectional view in the same plane as FIG. 3 and on a larger scale of the core cover assembly.

FIG. 4 shows details of the core cover elements, i.e. sleeves 26, sleeve elements 28, the plates 43 forming grid 30, the deflecting plate 32 with its fixture to certain sleeve elements 28 by a radial clearance expansion system 48, which can best be seen in FIG. 4a, sampling tubes 42 and plates 33, 38 which rigidify this group of tubes and contribute, with plate 32, to the deflection of the sodium jet.

FIG. 4 shows in greater detail the respective arrangement of the three deflecting plates 32, 33 and 38 suspended on grid 30 by sleeve elements 28 with a lateral clearance expansion system shown at 48 in FIG. 4a. FIG. 4 also makes it possible to understand how the sampling tubes 42 are fixed to the central deflecting plate 32, as well as to the upper 38 and lower 32 deflecting plates.

Figure 5:
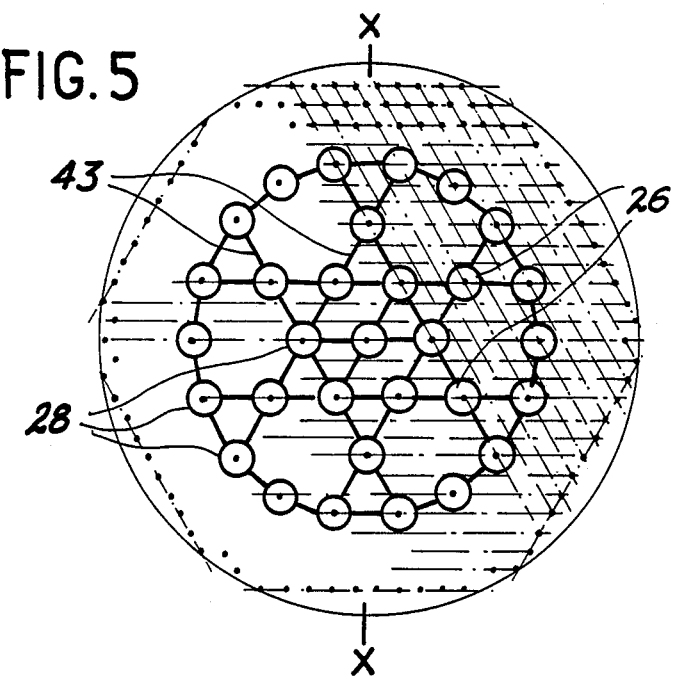
FIG. 5 a smaller scale cross-section of FIG. 4 along plane YY.

FIG. 5 is a cross-sectional view in plane YY of FIG. 4 and shows the location, in the particular embodiment described, of sleeves 26 and sleeve elements 28 spaced by the vertical flat plates 43.

Figure 6:
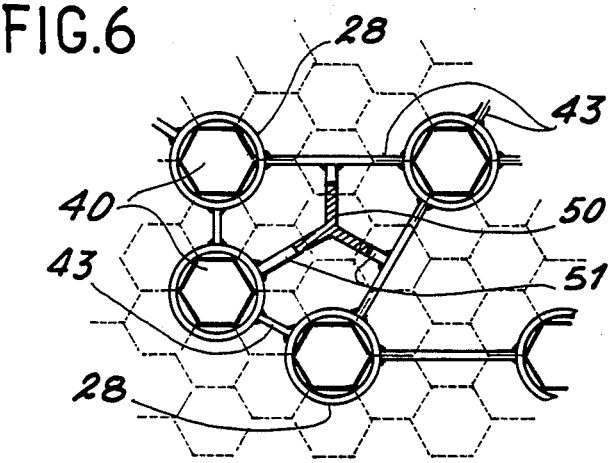
FIG. 6 a larger scale detail of FIG. 5 in the case where the core cover is suspended by metal tie bolts.

FIG. 6 shows a special embodiment, where the core cover is suspended on the inner small plug 12 by tie rods. It is possible to see a certain number of sleeves 28 spaced by metal plates 43 and having a three branch star-shape configuration, the lower end 50 of one of the tie rods being connected by vertical spacing plates 51 to plates 43. It is obvious that this tie rod configuration is not limitative and that the cross-section of the tie rods can have a random shape compatible with the necessary rigidity and can in particular have a cross or square configuration.

What is claimed is:

1. A core cover plug of a liquid metal-cooled nuclear reactor having a system of vessels sealed by a slab provided with two rotary plugs one of which is smaller than the other, said core cover plug being suspended on the smaller rotary plug, wherein the core cover plug comprises a structure constituted in part by suspension elements fixed to a lower part of the smaller rotary plug, and in part by control rod sleeve elements, said elements being joined, at least at the horizontal level, by vertical metal plates forming a honeycomb grid, and a conical metal deflecting plate positioned directly above the core and fixed to certain of said sleeve elements by a radial clearance expansion system, and wherein the deflecting plate supports a group of tubes for sampling liquid metal at the outlet from the core in order to located possible sheath fractures and for locating thermocouples, said group being rigidified by two other cone-shaped plates which, with the deflecting plate, contribute to the deflection of the liquid metal jet leaving the core, wherein said cone-shaped plates are located below said vertical metal plates.

2. A core cover plug according to claim 1, wherein the suspension elements are control rod sleeves.

3. A core cover plug according to claim 1, wherein the suspension elements have a square cross section.

4. A core cover plug according to claim 1 wherein the suspension elements have a cross-shape cross section.

* * * * *